United States Patent [19]

Kamath

[11] 4,130,700

[45] Dec. 19, 1978

[54] POLYMERIZATION PROCESS USING DIPEROXY KETALS AS FINISHING CATALYSTS

[75] Inventor: Vasanth R. Kamath, Tonawanda, N.Y.

[73] Assignee: Pennwalt Corporation, Philadelphia, Pa.

[21] Appl. No.: 757,189

[22] Filed: Jan. 6, 1977

[51] Int. Cl.² .......................... C08F 2/00; C08F 4/38; C08F 12/02; C08F 112/02
[52] U.S. Cl. ...................... 526/73; 526/216; 526/228; 526/232.3; 526/346
[58] Field of Search ............. 526/73, 216, 228, 232.3, 526/346

[56] References Cited

U.S. PATENT DOCUMENTS

| | | | |
|---|---|---|---|
| 3,433,825 | 3/1969 | Maltha et al. | 526/228 |
| 3,681,305 | 8/1972 | Tirpak | 526/228 |
| 3,726,846 | 4/1973 | Squire et al. | 526/228 |
| 3,743,630 | 7/1973 | Wood | 526/228 |
| 3,808,185 | 4/1974 | Jaspers | 526/228 |
| 3,832,336 | 8/1974 | Groepper et al. | 526/228 |

FOREIGN PATENT DOCUMENTS

| | | | |
|---|---|---|---|
| 848620 | 9/1960 | United Kingdom | 526/73 |
| 1243197 | 8/1971 | United Kingdom | 520/73 |

OTHER PUBLICATIONS

Swern, "Organic Peroxides", pp. 81-87, vol. 1, Wiley Inters., 1970.

Brandrup et al., "Polymer Handbook", II-1-55, Intersciences, 1966.

*Primary Examiner*—Herbert J. Lilling

[57] ABSTRACT

A process for the free-radical polymerization of vinyl monomers, including vinyl aromatic monomers, at at least two distinct progressively higher polymerization temperatures, each between the temperatures of about 70° C to about 150° C in the presence of at least two free-radical initiators, one of which initiators, used in relatively minor proportions, has the formula

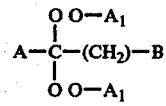

wherein x is a numeral from 1 to 5 inclusive, B is

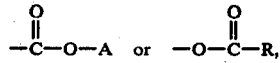

A is hydrocarbyl, $A_1$ is tertiary hydrocarbyl and R is A, a hydrocarbyloxy or alkylperoxy and the other initiator, used in relatively major proportions, has a 10 hour half-life temperature below about 100° C. The distinct temperatures for polymerization may occur as separate parts of a polymerization in which the temperature of the system continually increases.

9 Claims, No Drawings

POLYMERIZATION PROCESS USING DIPEROXY KETALS AS FINISHING CATALYSTS

BACKGROUND OF THE PRIOR ART

In the polymerization of vinyl monomers (especially vinyl aromatic monomers), the resultant polymer can contain significant amounts of residual monomer. This frequently leads to undesirable properties such as high shrinkage in boiling water, poor heat deflection temperature, potential discoloration due to oxidation of the monomer, objectionable odor etc. The prior art describes many attempts to obtain vinyl aromatic polymers having a low residual monomer content (e.g. no more than 0.1% by weight). One means of reducing the residual monomer content is to include a co-initiator, typically in minor amount, that is, a finishing catalyst. Usually the finishing catalyst has a higher 10 hour half life temperature than the other initiator.

In one prior art method, (British Plastics, p. 26, January 1957), the polymer (polystyrene) is extruded through a devolatilizer where the residual monomer is removed at 225° C. This method requires a large number of devolatilizers to handle large production volumes and the polymer must be heated to high temperatures which can lead to polymer degradation and poor physical properties.

U.S. Pat. No. 3,743,630 (issued July 3, 1973) to Wood describes the polymerization of styrene using ring substituted alkyl perbenzoates and branched chain alkyl perbenzoates. Compared with a t-butyl perbenzoate initiator, by using ring substituted alkyl perbenzoate (as a finishing catalyst) in combination with benzoyl peroxide, polystyrene (i.e. less than 0.1% by weight) with lower residual styrene can be obtained in less than 15 but more than 10 hours of polymerization time.

Canadian Pat. No. 915,850, issued Nov. 28, 1972 to Doak and Carrock describes the use of a minor amount of t-butyl peracetate or t-butylperoxy isopropyl carbonate (as finishing catalysts) and a major amount of benzoyl peroxide to obtain polystyrene which is substantially monomer free. The benzoyl peroxide is described as a low temperature organic peroxide initiator component. However, the polymerization time required is quite long (i.e. greater than 10 hours). The polymerization is conducted in suspension in two separate heating stages. The first stage of the polymerization is conducted at 75° C.–100° C. and the second stage at 105° C.–145° C. (for 1–5 hours).

British Pat. No. 1,330,896 to Blakemore teaches using certain high temperature peroxides, such as 3,5-dimethyl-3,5-di-t-butylperoxy-1,2-dioxolane, as co-initiators to produce polymers with low residual monomer concentration. However, Blakemore reports that the residual styrene content of the resultant polystyrene was greater than 0.1%. Further, the co-initiators described by Blakemore also have the disadvantage that the polymerization temperature has to be quite high. For example in the two stage procedure described by Blakemore, the final stage of the polymerization is conducted at 175°–185° for 2 hours.

Blakemore in British Pat. No. 1,329,859 describes the use of other co-initiators such as 1,1,4,4,7,7-hexamethylcyclo-4,7-diperoxynonane, which require excessively high polymerization temperatures.

Beresniewicz (U.S. Pat. No. 3,534,009) describes a method for reducing the residual vinyl acetate monomer content during the copolymerization of vinyl acetate and ethylene. After the main copolymerization the pressure is reduced from 100–3000 psi to atmospheric pressure and a source of free radicals (e.g. peroxide initiator) is added to the system. to reduce the residual vinyl acetate content to less than 0.35%.

Thompson and Jursich (Ref. U.S. Pat. No. 3,414,547) describe a polymerization process wherein a combination of a peroxide and an azo initiator is used to effectively reduce the residual monomer concentration. Most of the polymerization is done by the peroxide initiator and the azo initiator is the finishing catalyst. Catalysts other than the azo compounds are disclosed as not capable of reducing the residual monomer content below 2% by weight.

Bergmeister and Stoll (Ref. Ger. Offen. No. 2,229,569) describe a mixed catalyst system for preparing vinyl acetate copolymers. Using 2,2-bis(t-butylperoxy)butane in combination with another peroxide, such as benzoyl peroxide, produces a copolymer with a residual monomer concentration of 0.3% by weight as opposed to 2.1% by weight of vinyl acetate in the absence of 2,2-bis(t-butylperoxy)butane. A residual monomer concentration of 0.3% is not acceptable in most applications and especially in polymers which are used in contact with food.

The abstract of Japanese patent 74200/76 in Derwent Japanese Patents Report (Vol. 74, No. 21, page A + E-2, issued June 25, 1974) describes a process for the manufacture of copolymers of alpha-methylstyrene, acrylonitrile and styrene using azobiscyclohexanenitrile in combination with dicumyl peroxide and/or di-t-butyl peroxide as the initiators in a temperature range of 80°–130° C.

Guillet and Towne (U.S. Pat. Nos. 3,337,602 and 3,287,337) disclose novel peroxides useful as polymerization initiators, which have the general structure,

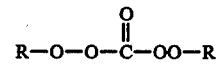

where R is the same or different aliphatic, cycloaliphatic or aromatic hydrocarbyl or substituted hydrocarbyl, desirably containing 5 to 20 carbon atoms.

Other patents which contain teachings relevant to lowering residual monomer content in polymers are U.S. Pat. No. 3,784,532, to Fellmann and Uhang and Canadian Pat. No. 751,552 (which discloses the use of di-t-butyl-diperoxycarbonate as a polymerization initiator, but not as a finishing catalyst).

STATEMENT OF INVENTION

The present invention provides a process for the free-radical polymerization of vinyl monomers, including vinyl aromatic monomers, at at least two distinct progressively higher polymerization temperatures of about 70° C. to about 150° C. in the presence of at least two free-radical initiators, one of which initiators of the "finishing" initiator) used in relatively minor proportions, has the formula

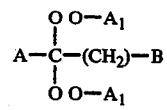

wherein x is a numberal from 1 to 5 inclusive, B is

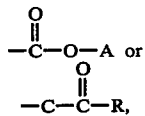

A is hydrocarbyl, $A_1$ is tertiary hydrocarbyl and R is a hydrocarbyloxy or alkylperoxy and the other initiator, used in relatively major proportions, has a 10 hour half-life temperature below about 100° C. The distinct temperatures for polymerization may occur as separate parts of a polymerization in which the temperature of the system continually increases. Typically, the finishing initiator is used in minor amount compared to the said initiator composition. Preferably over 75% by weight of the components of the initiator composition have a 10 hour half-life lower than the highest 10 hour half-life of the finishing initiator.

One advantage of the invention is that it can be used to obtain substantially monomer free polymers in a relatively short time. The reduction in polymerization time leads to substantial cost-savings in commercial operations. Typically, the time to produce polymer without more than 0.1 weight % residual monomer is reduced by at least 20% of the time required than when the diperoxyketal finishing initiator is not present.

In a preferred embodiment of the invention diperoxy ketals with the general structure,

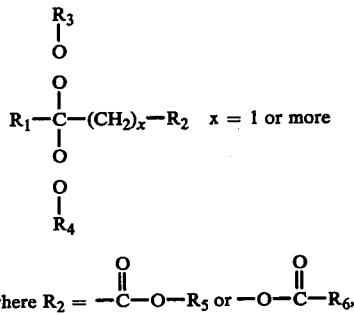

are used as finishing initiators in the polymerization of vinyl (especially vinyl aromatic) monomers. In these diperoxy ketals, $R_1$, $R_3$, $R_4$, $R_5$ and $R_6$ can be hydrocarbyl and preferably as follows.

$R_1$ is a lower alkyl group of 1 to 4 carbons;

$R_3$ and $R_4$ are the same or different tertiary alkyl groups of 4 to 12 carbons or tertiary aralkyl groups of 9 to 15 carbons;

$R_5$ and $R_6$ are selected from alkyl groups of 1 to 10 carbons, cycloalkyl groups of 4 to 10 carbons, alkenyl groups of 3 to 10 carbons, aryl groups of 6 to 14 carbons, or aralkyl groups of 7 to 11 carbons; and wherein $R_6$ can also be an alkoxy group of 1 to 10 carbons, cycloalkoxy group of 4 to 10 carbons, aryloxy group of 6 to 14 carbons, aralkoxy group of 7 to 11 carbons, or alkenyloxy group of 3 to 11 carbons; or A tertiary alkylperoxy radical of 4 to 12 carbons.

Compounds of this type are known in the literature and a method for their synthesis is described in U.S. Pat. No. 3,433,825 which issued Mar. 18, 1969 and U.S. Pat. No. 3,853,957 issued Dec. 10, 1974.

FURTHER DESCRIPTION

Although diperoxy ketals of the type defined herein can function as initiators they are not usually used in commercial practice because many other compounds provide superior initiation of polymerization. However, the polymerization of the present invention is conducted in the presence of one or more other low temperature free radical initiators, preferably in major amount compared to the total weight of diperoxyketals.

The nature of the low temperature free radical initiator (or initiators) is not critical. Preferably, over 75 weight % of the other initiators have lower 10 hour half-life temperatures than that of the diperoxyketal having the highest 10 hour half-life. The initiator can be one or more of the well known azo and/or peroxide free radical initiators, a partial list of which includes:

benzoyl peroxide; t-butyl peroctoate; t-butyl peroxypivalate; lauroyl peroxide; 2,5-dimethyl-2,5-bis(2-ethylhexanoylperoxy)-hexane; acetyl peroxide; t-butyl peracetate; 2,5-dimethyl-2, 5-bis(benzoylperoxy) hexane; 1,1-bis(t-butylperoxy)-3,3,5-trimethyl-cyclohexane; 1,8 and 1,9-di-(t-butylperoxycarbonyl)heptadecane; ethylene-bis(4-t-butylazo-4-cyanoval-erate); di-t-butyl diperoxyazelate; azobis-isobutyronitrile; 2-t-butylazo-2-cyanopropane; 1-t-butylzao-1-cyanocyclohexane; 2,2'-azo-bis-(2-methylvaleronitrile); di-t-butyl 4,4'-azobis-(4-cyanoperoxyvalerate); and di-t-butyl-diperoxy-carbonate.

While any of the known polymerization techniques can be used in the practice of this invention, in the preferred method, the polymerization is conducted in bulk, solution and/or suspension. Further, the process can be either a batch type reaction and/or a continuous reaction.

The polymerization can be conducted isothermally in one or more stages and/or non-isothermally by using a programmed temperature cycle. In the preferred method, at least the majority of the polymerization time is conducted with a continuously increasing temperature, as with a programmed temperature cycle. so that a major portion of the heat of polymerization is used to heat the reactor contents.

The rate at which the temperature is increased (or allowed to increase) during the polymerization, i.e. $\Delta T/\Delta t$ where $\Delta T$ is the increase in temperature in time $\Delta t$, will be influenced by factors such as the desired molecular weight, the available cooling capacity, reaction pressure etc. In general $\Delta T/\Delta t$ can have values of 5° C./hour to 50° C./hour, preferably it will have values of 5° to 50° C./hour $\Delta T/\Delta t$ can have the same value or different values during the course of the polymerization. When the polymerization is conducted isothermally, $\Delta T/\Delta t=0$.

The operating polymerization temperature range can vary from 40° to 200°, preferably from 70° to 150° C.

In the preferred method, vinyl monomers such as styrene, vinyl toluene, dichloro styrene etc. are homopolymerized and/or copolymerized with one or more vinyl or vinylidene monomers.

All vinyl and/or vinylidene type monomers which can be polymerized by a free radical mechanism can be used in the practice of this invention. This includes vinyl aromatic monomers such as styrene, hydrocarbyl substituted styrenes such as t-butyl styrene, vinyl toluene and partially or fully hydrogenated or halogenated derivatives of such vinyl aromatics (e.g., vinylcyclohexane, chloro,fluoro- or bromostyrenes, etc. Other operable vinyl monomers include vinyl chloride, vinylidene chloride, tetrafluorethylene, esters of acrylic/methacrylic acid such as methyl acrylate, methyl methacrylate, ethyl methacrylate, laurl methacrylate, isobutyl methacrylate, diethylenglycol-dimethacrylate, trimethylol-propane tri-methacrylate, etc. Other vinyl esters, such as vinyl acetate, vinyl propionate, vinyl stearate, etc. [diene monomers such as butadiene, isoprene, chloroprene, etc.] diene monomers such as butadiene, isoprene, chloroprene, etc.; other monomers such as acrylamide, methacrylamide, etc.; allylic monomers such as di-allyl phthalate, di-allyl maleate, allyl diglycol carbonate, etc.; acrylonitrile, methacrylonitrile.

A partial list of the monomers that can be used in the copolymerization of vinyl aromatic compounds includes:

methyl methacrylate; acrylonitrile; ethyl methacrylate; methacrylonitrile; isobutyl methacrylate; methyl acrylate; diethylene glycol dimethacrylate; trimethylol propane trimethacrylate; isoprene; chloroprene; 1,3-butadiene; 2-fluoro-1,3-butadiene; maleic anhydride, other vinyl aromatics (e.g. styrene and alpha-methyl styrene).

The total free radical initiator concentration in the process is preferably in the range of 0.01-2.0%, by weight based on total monomer concentration (more preferred, on a pure basis, 0.05-1.0%). Typically, the ratio of initiator to finishing catalyst is at least 2:1 on a weight basis. The preferred concentration of the finishing initiator on a pure basis is 0.001 to 1.0% by weight based on total monomer and more (preferably) 0.005 to 0.5%).

The term "pure basis" means that any impurities in the composition are not included when calculating the initiator concentration. All percentages are by weight unless otherwise specified.

ILLUSTRATIVE EXAMPLES

The following examples illustrate the test procedure in the comparative evaluation of a number of polymerization initiators as finishing initiators. In commercial bulk homopolymerization of styrene, the final polymer must contain no more than 0.1 weight % residual monomer. Accordingly, in the examples, only those test materials which produced polymer containing no more than 0.1% residual monomer were considered to be useful as finishing initiators.

EXPERIMENTAL PROCEDURE

Based on a charge of 5 grams monomer (styrene), the amount of each initiator component required was calculated using its assay value. Thus all initiator concentrations are expressed on a pure basis, even when the initiator composition used contained less than 100% of the initiator.

The initiators were weighed in "petti-cups" on an analytical balance (Mettle HIOT) and then the "petti-cups" were placed in previously cleaned Pyrex test-tubes, 18 × 150 mm, then 5 grams of styrene was added. The test-tubes were then chilled in ice-water, purged with nitrogen and sealed with a flame-torch.

The sealed test-tubes were immersed in an thermostated, stirred oil-bath, the temperature of which was adjusted by a rheostat.

At the end of the polymerization, the test-tubes were removed from the oil-bath, placed in previously cooled copper tubes in a freezer, (to assure that there was no post-polymerization) for at least half-an-hour. After this the test-tubes were broken and the polymer was dissolved in 50 ml. of benzene (containing 0.01 g benzoquinone per liter of benzene). A portion of this solution was used to determine the residual styrene content by gas chromatography. The rest of the solution was precipated in 300 ml. of methanol. The polymer was filtered, and dried in a vacuum oven at 50° C.

To calculate the viscosity-average molecular weight ($\overline{M}_v$), a benzene solution of the polymer (0.5g/dl) was used to measure the viscosity in a Cannon-Ubbelhode viscometer at 25° C. By extrapolating the viscosity data to zero concentration in the usual manner, the value of intrinsic viscosity ([n]) was obtained from which $\overline{M}_v$ was calculated by using the relationship, of Phys. Chem., 67, 566(1963))

$$[n] = KM_v^{-a}$$

where, for Polystyrene,
$K = 9.18 \times 10^{-5}$
$a = 0.743$

Initiator Abbreviations

| | |
|---|---|
| R-H | 1,8-Di(t-butylperoxycarbonyl)heptadecane |
| Luperox 118 | 2,5-Dimethyl-2,5-bis(benzoylperoxy)hexane |
| TBPB | t-Butyl Perbenzoate |
| TBPA | t-Butyl Peracetate |
| TBIC | 00-t-Butyl O-Isopropyl Monoperoxycarbonate |
| Luperox 500R | Dicumyl Peroxide |
| DTBP | Di-t-butyl Peroxide |
| R-233 | Ethyl 3,3-Bis(t-butylperoxy)butyrate |
| Lupersol 101 | 2,5-Dimethyl-2,5-di(t-butylperoxy)hexane |
| TDIB | alpha,alpha'-Bis(t-butylperoxy)diisopropylbenzene |
| D-230 | n-Butyl 4,4-Bis(t-butylperoxy)valerate |
| R-PA | 2,2-Di-(t-butylperoxy)propyl Acetate |
| Lupersol 256 | 2,5-Dimethyl-2,5-bis(2-ethylhexanoylperoxy)hexane |

EXAMPLE 1

A number of different initiators were evaluated, on an equal weight basis, as finishing initiators in styrene bulk polymerization. The initiator blend used consisted of,
0.10 phm R-H
0.05 phm Luperox 118
and 0.02 phm of finishing catalyst.

The polymerization was conducted using a programmed temperature cycle which began at 80° C. and progressed constantly to 135° C. on the elapsed times between indicated temperatures as follows:

| Time (Hours) | 0 | 0.5 | 1.0 | 2.0 | 3.0 | 4.0 |
|---|---|---|---|---|---|---|
| Temperature | 80 | 95.0 | 110.0 | 125.0 | 135.0 | 140.0 |

The different finishing initiators used, the results obtained, namely residual styrene concentration and the viscosity-average molecular weight ($M_v$), are given in Table I below.

These results show that only one of the eight initiators evaluated, namely R-233, was capable of reducing the residual sytrene concentration to the desired value of no more than 0.1% by weight. The viscosity-average molecular weight ($M_v$) of the polymer was approximately the same for all.

Table I

Styrene Bulk Polymerization

| No. | Finishing Initiator | Wt% Residual Styrene | $M_v \times 10^{-5}$ |
|---|---|---|---|
| 1. | R-233 | 0.1 | 2.34 |
| 2. | TBPB | 0.3 | 2.35 |
| 3. | TBPA | 0.3 | 2.24 |
| 4. | TBIC | 0.7 | 2.35 |
| 5. | Luperox 500R | 0.13 | 2.21 |
| 6. | DTBP | 0.25 | 2.24 |
| 7. | Lupersol 101 | 0.23 | 2.18 |

Table I-continued

| | Styrene Bulk Polymerization | | |
|---|---|---|---|
| No. | Finishing Initiator | Wt% Residual Styrene | $M_v \times 10^{-5}$ |
| 8. | TDIB | 0.25 | 2.19 |

EXAMPLE 2

The efficiency of the diperoxy ketal as a finishing catalyst compared to dicumyl peroxide (Luperox 500R) is shown by this example.

The initiator system used consisted of a blend of 0.10 phm Lupersol 256, 0.05 phm Luperox 118, and 0.02 phm finishing catalyst.

The polymerization was conducted with a programmed temperature cycle which began at 80° C. and progressed constantly to 140° C. on the schedule indicated and was then held constant for an additional hour.

| Time (Hours) | 0 | 1.0 | 2.0 | 3.0 | 4.0 | 5.0 |
|---|---|---|---|---|---|---|
| Temperature (° C) | 80 | 110.0 | 125.0 | 135.0 | 140.0 | 140.0 |

The residual styrene level was determined after 4.0, 4.5 and 5.0 hours of polymerization and the results are as follows:

| Polymerization Time (Hours) | % Residual Styrene | |
|---|---|---|
| | R-233 | Luperox 500R |
| 4.0 | 0.28 | 0.88 |
| 4.5 | 0.15 | 0.48 |
| 5.0 | 0.10 | 0.29 |

The above results show that by using R-233 as a finishing catalyst, the desired residual styrene level can be attained in a relatively shorter period of time.

Thus in the process of the present invention, using R-233 as a finishing initiator, one is able to produce polymer having a residual monomer concentration of no more than 0.1% by weight in the relatively short polymerization time of 4 to 5 hours. Under similar conditions, prior art compounds such as TBPB, TBIC and TBPA were not capable of reducing the residual monomer concentration to the desired value.

EXAMPLE 3

In Example 1 it was shown that R-233, i.e. ethyl 3,3-bis(t-butyl-peroxy)butyrate, is a good finishing initiator. In this example, the corresponding t-amyl analog of R-233, i.e. ethyl 3,3-bis(t-amylperoxy)butyrate and two others, n-butyl4,4-bis(t-butylperoxy) valerate ("D-230") and 2,2-di(t-butyl peroxy)-propyl acetate ("R-PA") were used as finsihing catalysts. The initiator blend and the polymerization conditions were the same as those described in Example 1.

The results obtained were as follows:

| Finishing Initiator | Residual Styrene | $M_v \times 10^{-5}$ |
|---|---|---|
| t-amyl analog of R-233 | 0.1% | 2.48 |
| D-230 | 0.1% | 2.45 |
| R-PA | 0.1% | 2.37 |

The results show that "D-230," (the n-butyl 4,4-bis (t-butylperoxy)-butyrate, "R-PA," the 2,2-di(t-butyl-peroxy)propyl acetate and ethyl 3,3-bis-(t-amylperoxy)-butyrate are efficient finishing initiators.

EXAMPLE 4

In this Example, R-233 was evaluated as a finishing initiator in a three-stage isothermal styrene bulk polymerization system. The first-stage of polymerization was at 90° C. for 3 hours, the second-stage at 115° C. for 2 hours and the third stage at 130° C. for 1 hour.

The initiator system consisted of,
0.15 phm Lupersol 256
0.05 phm Luperox 118
and 0.02 phm finishing initiator.

The results obtained are as follows:

| Finishing Initiator | Residual Styrene | $M_v \times 10^{-5}$ |
|---|---|---|
| R-233 | 0.06% | 3.03 |
| TBPB | 0.13% | 3.01 |

I claim:

1. A process for the free-radical polymerization of vinyl monomers, including vinyl aromatic monomers, comprising polymerizing said vinyl monomers, at least two distinct progressively high polymerization temperatures, each between the temperatures of about 70° C. to about 150° C. in the presence of at least two free-radical initiators, one of which initiators, used in relatively minor proportions as a finishing catalyst, has the formula

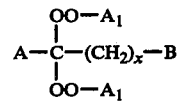

wherein
x is a numeral from 1 to 5 inclusive,
B is

A is hydrocarbyl
$A_1$ is tertiary hydrocarbyl, and
R is A, hydrocarbyloxy or alkylperoxy,
and the other initiator, used in relatively major proportions, has a 10 hour half-life temperature below about 100° C., wherein the same solvent is used for measuring the half-life of all initiators and wherein the time to produce polymer without more than 0.1 weight percent residual monomer is reduced by at least 20% of the time required than when the diperoxyketal finishing initiator is not present.

2. The process of claim 1 wherein the polymerization process is conducted isothermally at two distinct temperatures.

3. The process of claim 1 wherein the distinct temperatures occur as separate parts of the polymerization in which the temperature of the system continually increases.

4. The process of claim 1 wherein the structurally defined initiator has the formula

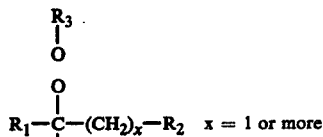

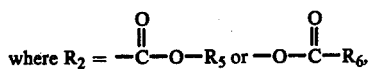

$R_1$, $R_3$, $R_4$ and $R_5$ are hydrocarbyl and $R_6$ is hydrocarbyl, oxyhydrocarbyl or alkyl peroxy.

5. The Process of claim 4 wherein $R_1$ is a lower alkyl group of 1 to 4 carbons; $R_3$ and $R_4$ are the same or different tertiary alkyl groups of 4 to 12 carbons; $R_5$ and $R_6$ are selected from alkyl groups of 1 to 10 carbons, cycloalkyl groups of 4 to 10 carbons, alkenyl groups of 3 to 10 carbons, aryl groups of 6 to 14 carbons, or aralkyl groups of 7 to 11 carbons; and wherein $R_6$ is also selected from alkoxy groups of 1 to 10 carbons, cycloalkoxy groups of 4 to 10 carbons, aryloxy groups of 6 to 14 carbons, aralkoxy groups of 7 to 11 carbons, or alkenyloxy groups of 3 to 11 carbons; and tertiary alkylperoxy radicals of 4 to 12 carbons.

6. The process of claim 4 wherein said diperoxy ketal is selected from ethyl 3,3-bis(t-butylperoxy)butyrate, ethyl 3,3-bis(t-amylperoxy)butyrate, n-butyl 4,4-bis(t-butylperoxy)valerate and 2,2-di-(t-butylperoxy)propyl acetate.

7. The process of claim 1 wherein the initiator used in major proportions is 2,5-dimethyl-2,5-bis(2-ethylhexanoylperoxy)hexane.

8. The process of claim 1 wherein the initiator used in major proportions is 1,8-di(t-butylperoxycarbonyl)heptadecane.

9. The process of claim 1 wherein the finishing initiator is a combination of ethyl 3,3-bis(t-butylperoxy)butyrate and 2,5-dimethyl-2,5-bis(benzoylperoxy) hexane wherein the 2,5-dimethyl-2,5-bis(benzoylperoxy) hexane is present in a weight proportion two and one-half times the ethyl 3,3-bis(t-butylperoxy)butyrate.

* * * * *